United States Patent [19]
Allert

[11] 3,900,932
[45] Aug. 26, 1975

[54] HOSE CLAMP

[76] Inventor: Kurt Allert, Brestenbergstr. 48, 7239 Seedorf, Germany

[22] Filed: Apr. 30, 1974

[21] Appl. No.: 465,505

[30] Foreign Application Priority Data
Apr. 30, 1973 Germany.................... 2321814

[52] U.S. Cl............................................ 24/274 R
[51] Int. Cl.²................................... B65D 63/00
[58] Field of Search ........ 24/274 R, 274 P, 274 WB

[56] References Cited
UNITED STATES PATENTS

| | | | |
|---|---|---|---|
| 1,397,508 | 11/1921 | Gillet | 24/274 R |
| 2,452,806 | 11/1948 | Tetzlaff | 24/274 R |
| 3,028,650 | 4/1962 | Tinsley | 24/274 R |
| 3,195,204 | 7/1965 | McKown | 24/274 R |
| 3,351,989 | 11/1967 | Cheris et al. | 24/274 R |

FOREIGN PATENTS OR APPLICATIONS

| | | | |
|---|---|---|---|
| 566,271 | 12/1944 | United Kingdom | 24/274 R |
| 98,601 | 4/1964 | Denmark | 24/274 R |
| 217,111 | 1/1942 | Switzerland | 24/274 R |

*Primary Examiner*—Donald A. Griffin
*Attorney, Agent, or Firm*—Edwin E. Greigg

[57] ABSTRACT

A hose clamp having a preferably, relatively wide strap and a tightening mechanism for tightening the strap is described. An end region of the strap is provided with at least one transverse channel, formed by crimping or bending the strap in this end region. At least one base member, which is part of the housing of the tightening mechanism, engages the transverse channel in a form-fitting manner. The base member is preferably flush with the adjacent interior sides of the strap.

7 Claims, 5 Drawing Figures

PATENTED AUG 26 1975 3,900,932

3,900,932

HOSE CLAMP

BACKGROUND OF THE INVENTION

This invention relates to a hose clamp which includes a strap and a tightening mechanism. The invention relates, more particularly, to a hose clamp having a preferably relatively wide strap and a tightening mechanism for tightening the strap. Hose clamps of this type serve for fastening hose to fittings or for fastening hose inserts, such as connection parts, spray nozzles, or the like, within the hose.

Hose clamps are known in many and different embodimental forms. Hose clamps are known which are relatively easy to manufacture. Some hose clamps are known which are easy to install. Still others are known which are particularly strong, i.e. these still others can tolerate high strap tension.

SUMMARY OF THE INVENTION

It is an object of the present invention to provide a hose clamp which is simple to manufacture and to install, and also has high strength.

It is another object of the present invention to provide a hose clamp which can tolerate high strap tension, and also has other advantages.

It is a further object of the present invention to provide a hose clamp composed of a few parts.

The foregoing objects, as well as others which are to become clear from the text below, are achieved in accordance with the present invention by providng a hose clamp having a preferably, relatively wide strap and a tightening mechanism for tightening the strap. An end region of the strap is crimped or bent to form at least one inwardly facing open transverse channel. A base member of the housing of the tightening mechanism fittingly engages the transverse channel, preferably flush with the adjacent interior sides of the strap.

The transverse channel or channels of the strap make possible a secure anchoring of the appropriate end of the strap within the housing and one which is capable of tolerating high tensile forces without the necessity, during manufacture, of spot welding or soldering steps. The hose clamp thus provided has very high strength, good stability, and consists of a minimum number of parts. The parts of the hose clamp can be composed of metal or of other desired materials, for example, also of a plastic or other synthetic material.

When, as is preferably provided, the at least one base member which engages the transverse channel is flush with the adjacent interior sides of the strap, then a satisfactory and stepless hose contact is achieved by which the hose is firmly, yet gently, clamped. The surface of the base member or members intended to contact the hose can be approximately adapted in its entirety to the circular shape of the hose. In many cases, however, it is sufficient and advantageous if the base member or members of the housing which engage the transverse channel are approximately flat or that their curvature is adapted only to the largest intended outer diameter of a hose, especially if the same housing is to be used at will for straps of very different lengths, i.e. for very different outer hose diameters.

Preferably, it can be provided that the strap has a single transverse channel extending in width nearly over the entire length of the housing of the tightening mechanism.

The tightening means of the tightening mechanism can have any embodiment whatever; for example, the housing can have threads in which a screw is guided extending in the longitudinal direction of the strap and serving as the tightening means, and where the end of the strap opposite to that which engages the transverse channel is attached to the end of the screw opposite the screw head so that, by turning the screw, the strap can be tightened to clamp the hose. Other exemplary forms of the tightening mechanism are, of course, possible as will be readily apparent to those skilled in the art.

Preferably, the tightening mechanism can have, as its tightening means, a worm gear rotatably mounted in the housing and secured against axial displacement and whose threads engage ribs within the strap, separated by perforations. The worm gear and the region of the strap in which the ribs are located act together in the manner of a worm gear drive. Thus, the strap can be tightened in the simplest possible manner by turning the worm gear, wherein, depending on the length of the region in which the ribs are located, hoses of very different diameters can be clamped by means of the hose clamp developed in this manner. The worm gear suitably is equipped with a head which is so embodied that it can be turned by a readily available tool, preferably by means of a screwdriver or a wrench.

In the simplest and most advantageous case, the hose clamp according to the invention can consist of only three different single parts which are held together only by form-fitting engagement and thus secured against separation. The three parts are suitably so chosen that no spot welding, gluing, soldering, nor the like, is required in using them in the manufacturing and assembling of the clamps.

Nevertheless, the hose clamp according to the invention has uncommonly high strength and stability, and is distinguished also by the possibility of economical and efficient manufacture as is especially important in mass-produced articles of the present kind. In a preferred embodiment, it is provided that the housing is equipped with an arch-shaped middle part to which attach outwardly pointing shoulders which are downwardly angled and that the base members connect to the lowest ends of these shoulders. This results in a particularly high strength for the housing so that, even during extreme tightening of the strap, the housing retains its form, and does not tend to spread outwardly.

Straps of known widths can be used, preferably relatively wide straps of, for example, from about 8 to about 12 mm, but the invention is not limited thereto. The straps can preferably be relatively thin, for example, they may have a thickness of about 1 mm.

The housing can be made symmetric with respect both to a longitudinal and a mean transverse plane which is especially advantageous both for manufacturing and for added strength and stability.

DESCRIPTION OF THE PREFERRED EMBODIMENTS

Figure 1:
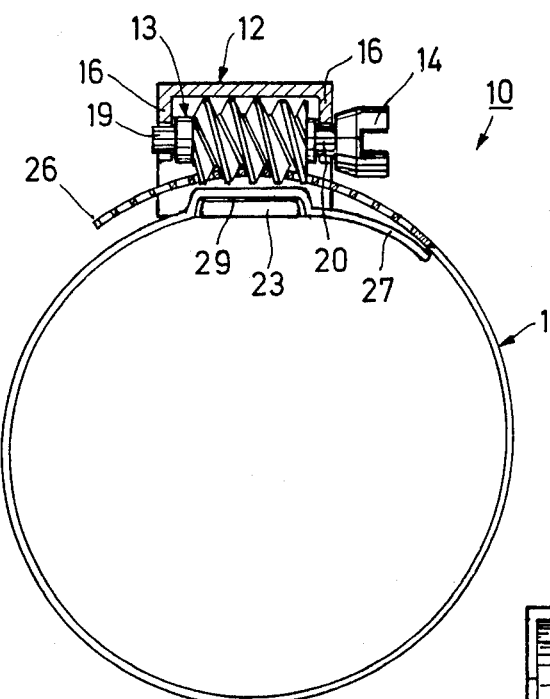
FIG. 1 is a front, partially sectional, view of a hose clamp according to the invention, its housing being visible from a side.
Figure 2:
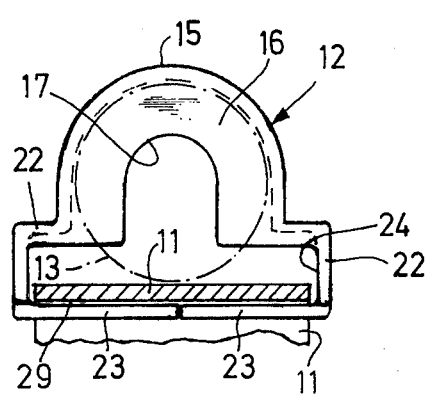
FIG. 2 is a front view of the housing of the hose clamp shown in FIG. 1, in enlarged representation, thinner cross sections being used than were used in FIG. 1.
Figure 3:
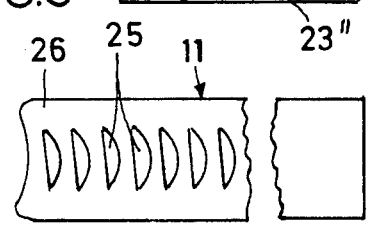
FIG. 3 is a top view of the strap of the hose clamp shown in FIG. 1, in fractured representation.

As shown in FIGS. 1-3, an illustrated hose clamp 10, according to the present invention, has only three individual, single parts connected with one another only by fitting engagement. The three parts consist of a strap 11, a housing 12, penetrated by the two end regions of the strap 11, and a worm gear 13, rotatably mounted in the housing 12 and secured against axial displacement. The worm gear 13 is equipped with a screw head 14 extending beyond the housing 12. These three parts 11, 12 and 13 can be made of metal, but also can be made of other suitable materials, such as a synthetic plastic or the like. In an exemplary embodiment, the housing 12 is made from sheet metal by punching and bending and has an arch-shaped middle region or portion 15, whose faces have inwardly directed flanges 16 bent at right angles, each of which has a slit-like aperture 17 which is semi-circular on top and serves for the rotatable mountings of a front stud 19 and of an intermediate region or portion 20 of the worm gear 13. These flanges 16 also serve to secure the worm gear 13 against axial displacement in that the worm gear 13 has circular shoulders, as may be seen in the drawing, by means of which the interior walls of the flanges 16 cooperate as a kind of axial bearing. Descending on both sides from the arch-shaped middle portion 15 are two outwardly bent rectangular shoulders 22 whose downwardly pointing legs are connected at right angles to flat, tab-shaped base members 23 whose mutually adjacent edge faces touch one another, but wherein the point of contact does not need to be welded because the housing 12 is capable of sustaining high tensile forces because of its shape and because of the positioning of an end of the holding strap 11 in the housing 12.

As especially clearly visible from FIG. 2, a lower region of the housing 12 is shaped to form an approximately rectangular passage 24 for the two ends of the strap 11 to pass through the housing 12. The threads of the worm gear 13 extend into the housing 12 and engage shaped apertures 25 in the strap 11 which are in the form of segments of circular arcs, and are obliquely inclined with respect to the longitudinal axis of the strap 11 and are equidistant. These apertures 25 are so formed that, by turning the worm gear 13, that region of the strap 11 which carries the apertures 25 is slidable longitudinally in the forward and backward directions for the purpose of tightening and releasing the tightening mechanism. Thus, the threads of the worm gear 13 engage the ribs in the strap 11 which are located between the apertures 25 in the manner of a worm gear device. The worm gear 13 may be turned by a screwdriver. The worm gear 13 is self-locking so that any setting of the strap 11 is retained by itself independent of the applied tension in the strap 11 for the purpose of clamping a hose.

The perforated region of the strap 11, which begins at one end 26 of the strap 11, can extend suitably over a relatively large part of the length of the strap 11 so that the hose clamp 10 can be used to clamp hoses of very different outer diameters.

The other end region 27 of the strap 11, according to the present invention in a particularly advantageous embodiment, has a transverse channel 29 formed by double bending or crimping in which the two tab-shaped base members 23 of the housing 12 engage in a form-fitting manner and are flush with the adjacent interior surfaces of the strap 11, i.e. the depth of the transverse channel 29 corresponds to the thickness of the base members 23 so that a stepless contact of the hose to be clamped is also guaranteed in this region.

The three parts 11, 12 and 13 of the hose clamp 10 are held together only by fitting engagement. No welding or soldering is required; indeed, such prior art techniques are avoided altogether.

During the manufacture of the hose clamp 10, it is suitable to leave the housing 12 temporarily downwardly open in that the two base members 23 are not as yet bent into the position shown best in FIG. 2 of the drawing. Then the worm gear 13 and that end of the strap 11 which has the transverse channel 29 are inserted into the housing 12. Only then are the two base members 23 bent into the position shown. The open clearance between the worm gear threads and the base members 23 is so chosen that firstly, the doubly bent or crimped end region 27 of the strap 11 cannot be pulled from the housing 12 because of the presence of the transverse channel 29 and, secondly, so that the perforated region of the strap 11 is held in gear engagement with the worm gear 13. This is accomplished by making the distance between the bottom of the transverse channel 29 of the strap 11 and the threads of worm gear 13 smaller than the thickness of the strap 11, preferably substantially smaller than the thickness of the strap 11. Thus, all three parts 11, 12 and 13 of the hose clamp 10 are held together in a form-fitting manner and cannot separate from one another.

Nevertheless, the one end 26 of the strap 11 can be removed from the housing 12 at any time by turning the worm gear 13 and can also be inserted again so that the installation of the hose clamp 10 on a hose presents no problem.

The three parts 11, 12 and 13 of the hose clamp 10 still remain inseparable even when the one end 26 of the strap 11 has been removed from the housing 12; consequently, no part of the hose clamp 10 can get lost. In FIG. 2, the worm gear 13 is shown in broken lines and the other end region 27 of the strap 11 is shown in section.

Figure 4:
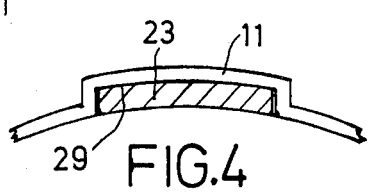
FIG. 4 is a partial, front view showing a variant of a detail of the clamp of FIG. 1.

Naturally, it is easily possible to arch the base members 23, as best seen in FIG. 4, so that their curvature corresponds to that of a provided hose with a given, for example a medium or maximum, outer diameter.

Even though the invention is used especially advantageously in conjunction with the worm gear 13, in many cases other tightening means for tightening the strap 11 can be provided, for example a gear wheel engaging a perforated region of the strap 11 whose longitudinal axis, with reference to FIG. 1, would be perpendicular to the plane of FIG. 1 as viewed.

However, a gear drive of this type would not be self-locking and one would have to provide means for securing the final position of the gear wheel set for tightening the strap, for example, by a safety nut or the like.

The exemplary, illustrated embodiment shows a single transverse channel 29 of the strap 11, and this is sufficient and advantageous when this transverse channel 29 extends in width nearly over the entire length of the housing 12. However, it is possible in some cases to provide several transverse channels by crimping or bending the strap 11; for example, one transverse channel could be provided in the vicinity of each of the two faces of the housing 12, which would be engaged by the two base members 23 or by base members extending from two mutually opposite sides of the housing 12.

Figure 5:
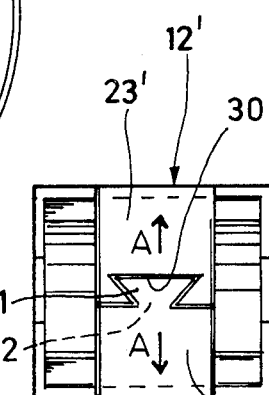
FIG. 5 is a bottom view of a variant of the housing base of the housing visible in FIGS. 1 and 3, only an empty housing being shown for the purpose of clarity.

It can be suitable also to connect the two base members 23 of the bottom of the housing 12, which are now shown separated by a butting joint in FIG. 2, by soldering or welding so as to create a positive tensile connection with each other in directions parallel to the bottom surface. But, it is more advantageous, from a manufacturing point of view, to provide this rigid tensile connection only by form-fitting these two base members 23 as is demonstrated in the further exemplary embodiment shown in FIG. 5. According to FIG. 5, one base member 23' of a housing 12' has a dovetail perforation 30 into which a complementary projection 31 of the other base member 23'' is inserted in a form-fitting manner so that the two base members 23', 23'' cannot be separated by tensile forces acting in the direction of arrows A. Of course, other shapes of the perforation of one of the base members 23' and of the projection of the other base member 23'' engaging therein can be provided which result, by form-fitting, in a positive tensile connection of the two base members 23', 23''.

It is to be appreciated that the foregoing detailed description and accompanying drawing figures relate to exemplary embodiments of a hose clamp according to the present invention. These embodiments are set out by way of example, not by way of limitation. Numerous other embodiments and variants are possible within the spirit and scope of the invention, the scope being defined in the appended claims.

That which is claimed is:

1. A hose clamp comprising, in combination:
    a. a strap having an end portion thereof formed to define a single, inwardly open transverse channel having interior sides; and
    b. a tightening mechanism including:
        i. a housing for parts of said mechanism, said housing having an arched middle portion and outwardly directed shoulders which are angled downwardly,
        ii. said parts including two base members in engagement with said single, transverse channel in a form-fitting positive tensile manner, said base members being embodied as two angled tops of said housing and having free ends positioned in said single, transverse channel from opposite ends thereof, said two base members being respectively connected to respective lower ends of said shoulder and said housing being free of any fixed connection to said strap,
        iii. a worm gear carried within said housing and secured against axial displacement therein, said housing having inwardly directed flanges, at its two faces, which serve for axial and radial mounting of said worm gear, threads of said worm gear engaging ribs in said straps, said flanges forming apertures for said worm gear, said apertures being open toward said strap and the distance between the bottom of said transverse channel of said strap and said threads of said worm gear being smaller than the thickness of said strap, and
        iv. an opening with a narrowing toward its free end of one of said base members and a projection from the said free end of the other of said base members, said projection being inserted into said opening.

2. A hose clamp according to claim 1, wherein said single, transverse channel extends in width substantially over the entire length of said housing.

3. A hose clamp according to claim 1, wherein said ribs in said strap are formed by apertures in said strap.

4. A hose clamp according to claim 1, wherein said transverse channel is arched to correspond to the curvature of a particular outer diameter of a hose to be clamped.

5. A hose clamp according to claim 1, wherein said opening in said one of said base members is progressively narrowed toward its free end.

6. A hose clamp according to claim 5, wherein said projection is a complementary projection which is inserted into said opening.

7. A hose clamp according to claim 1, wherein said opening in said one of said base members and said projection in said other of said base members are of complementary shapes.

* * * * *